United States Patent
Boyle et al.

(10) Patent No.: US 7,313,570 B2
(45) Date of Patent: Dec. 25, 2007

(54) MAPPING ENTERPRISE JAVA BEAN ATTRIBUTES TO DATABASE SCHEMA

(75) Inventors: Alan Iain Boyle, Chandlers Ford (GB); Kenneth A. Chupa, Guelpha (CA); Sridhar Sudarsan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 10/912,477

(22) Filed: Aug. 5, 2004

(65) Prior Publication Data

US 2006/0031243 A1 Feb. 9, 2006

(51) Int. Cl.
*G06F 7/00* (2006.01)
*G06F 17/00* (2006.01)
(52) U.S. Cl. .................... 707/102; 707/101
(58) Field of Classification Search ........... 707/100, 707/101, 102
See application file for complete search history.

(56) References Cited

U.S. PATENT DOCUMENTS

2002/0049749 A1* 4/2002 Helgeson et al. ............ 707/3
2004/0260715 A1* 12/2004 Mongeon et al. .......... 707/101
2005/0055382 A1* 3/2005 Ferrat et al. ............... 707/201

* cited by examiner

*Primary Examiner*—Shahid Alam
*Assistant Examiner*—Alex Gofman
(74) *Attorney, Agent, or Firm*—John Biggers; Matthew Talpis; Biggers & Ohanian, LLP

(57) ABSTRACT

Mapping Enterprise Java Bean ("EJB") attributes to database schema including providing a first metamap including one or more abstracted variable characteristics of a first database schema and creating from the first metamap a second metamap for a second database schema including varying one or more of the abstracted variable characteristics to conform to the second database schema. Typical embodiments also include synchronizing, in response to methods invoked on the EJB and in dependence upon the second metamap, the state of the EJB with a persistent data store having the second database schema. In typical embodiments, synchronizing the state of the EJB with a persistent data store having the second database schema also includes creating records, updating records, and deleting records in the persistent data store.

14 Claims, 4 Drawing Sheets

MAPPING ENTERPRISE JAVA BEAN ATTRIBUTES TO DATABASE SCHEMA

BACKGROUND OF THE INVENTION

1. Field of the Invention

The field of the invention is data processing, or, more specifically, methods, systems, and products for mapping Enterprise Java Bean™ ("EJB") attributes to database schema.

2. Description of Related Art

Enterprise JavaBeans is a Java™ API developed by Sun Microsystems that defines a component architecture for multi-tier client/server systems. Enterprise JavaBeans define an architecture for the development and deployment of transactional, distributed object applications-based, server-side software components. These server-side components, called 'enterprise beans,' are distributed objects that are hosted in Enterprise JavaBean containers and provide remote services for clients distributed throughout a network. These server-side components are sometimes known as 'Enterprise JavaBeans,' 'EJB components,' 'enterprise beans,' 'beans,' and sometimes by other terms as well. In this specification, however, the server side component is generally referred to as an 'EJB.'

EJBs are software components that run in a special environment called an EJB container. The container hosts and manages an EJB in the same manner that the Java Web Server hosts a servlet or an HTML browser hosts a Java applet. An EJB functions only in an EJB container. If an enterprise bean needs to access a JDBC connection or another enterprise bean, it does so through the container; if an enterprise bean needs to access the identity of its caller, obtain a reference to itself, or access properties it does so through the container. The enterprise bean interacts with its container through one of three mechanisms: callback methods, the EJBContext interface, or the Java Naming and Directory Interface (JNDI).

A client program contacts an EJB server and requests that the server create an EJB to do data processing on behalf of the client. The server responds by creating the server-side object (the EJB component instance that is referred to generally in this specification as an 'EJB'). The server also returns a proxy object (the EJB object, an object that implements the EJB remote interface, referred to generally as a 'remote object') whose interface is the same as the EJB's and whose implementation performs remote method invocations in the EJB on behalf of the client. The client then uses the remote object as if it were a local object, never knowing or caring that a server-side EJB is actually doing all the work.

A client program creates an object on a server by use of an EJB home interface. Each EJB class has what is called a home interface that defines the methods for creating EJB instances on the server. An EJB home interface extends the interface javax.ejb.EJBHome, which defines base-level functionality for a home interface. All methods in this interface are required to be remotely executable according to Java RMI (Remote Method Invocation). The EJB home interface also defines one or more factory methods named 'create( ).' The return value of these factory methods is the remote interface (that is, a remote object) for the EJB.

When a client wants to create a server-side bean, an EJB, the client uses the Java Naming and Directory Interface (JNDI) to locate the home interface for the class of bean it wants. The JNDI is a standard extension to the Java core that provides a global service to any Java environment, allowing Java programs to locate and use resources by name, to find out information about those resources, and to traverse structures of resources. A client accesses JNDI services through a method name 'lookup( )' in an instance of JNDI's InitialContext class. This initial context lookup returns an instance of a home interface for an EJB. In this specification, such an instance of a home interface is referred to as a 'home object.'

Once the client has the home interface for the EJB class it wants to create, it calls one of the factory methods, that is, a create( ) method, on the home interface to create a server-side object. The client-side home interface object does a remote method call to the EJB container on the server, which then creates the EJB component, that is, the EJB itself, and returns an EJB remote object to the client. The client may then call the remote object's methods, which are forwarded to the container and then to the EJB.

Container-managed persistence beans ('CMP beans') are the simplest for the bean developer to create and the most difficult for the EJB sever to support. CMP beans are difficult to support because all the logic for synchronizing the bean's state with its backup persistent database is handled by the container. The bean developer is required to write no data access logic, while the EJB server takes care of all persistence needs automatically, a difficult task. Many EJB containers support automatic persistence to a relational database, but the level of support varies; it is not part of any industry-wide standard or binding specification. Some EJB containers very sophisticated EJB attribute-to-database column mapping, while others are very limited.

An EJB is a complete component made up of at least two interfaces (home and remote) and a bean implementation class. Here is an explanatory pseudocode example of an EJB class:

```
import javax.ejb.EntityBean;
public class CustomerBean implements EntityBean {
    int         customerID;
    Address     myAddress;
    Name        myName;
    CreditCard myCreditCard;
    // CREATION METHODS
    public Customer ejbCreate(Integer id) {
        customerID = id.intValue( );
        return null;
    }
    public void ejbPostCreate(Integer id) { }
    public Customer ejbCreate(Integer id, Name name) {
        myName = name;
        return ejbCreate(id);
    }
    public void ejbPostCreate(Integer id, Name name) { }
    // BUSINESS METHODS
    public Name getName( ) {return myName;}
    public void setName(Name name) {myName = name;}
    public Address getAddress( ) {return myAddress;}
    public void setAddress(Address address) {myAddress = address;}
    public CreditCard getCreditCard( ) {return myCreditCard;}
    public void setCreditCard(CreditCard card) {myCreditCard = card;}
    // CALLBACK METHODS
    public void setEntityContext(EntityContext cntx) { }
    public void unsetEntityContext( ) { }
    public void ejbLoad( ) { }
    public void ejbStore( ) { }
    public void ejbActivate( ) { }
    public void ejbPassivate( ) { }
    public void ejbRemove( ) { }
}
```

This is an example of a CMP entity bean. Notice that there is no database access logic in the EJB. There is no database access logic in the EJB because the EJB's container provides tools for mapping the fields in the EJB 'CustomerBean' to a database. The CustomerBean class, for example, could be mapped to any database providing it contains data that is similar to the fields in the bean. In this case the bean's instance fields or 'attributes' include a primitive int and three attribute objects, Name, Address, and CreditCard. Below are exemplary definitions for the three attribute objects:

```
// The Name class
public class Name implements Serializable {
    public String lastName,
    firstName, middleName;
    public Name(String lastName, String firstName, String
    middleName) {
        this.lastName = lastName;
        this.firstName = firstName;
        this.middleName = middleName;
    }
    public Name( ) { }
} // End of Name Class
// The Address class
public class Address implements Serializable {
    public String street,
    city, state, zip;
    public Address(String street, String city,String state, String zip) {
        this.street = street;
        this.city = city;
        this.state = state;
        this.zip = zip;
    }
    public Address( ) { }
}
// The CreditCard class
public class CreditCard implements Serializable {
    public String number,
    type, name;
    public Date expDate;
    public CreditCard(String
        number, String type,String name,
        Date expDate) {
        this.number = number;
        this.type = type;
        this.name = name;
        this.expDate = expDate;
    }
    public CreditCard( ) { }
}
```

The EJB attributes in this example are referred to as container-managed fields because the container is responsible for synchronizing their state with the database. Container-managed fields can be any primitive data types or serializable data types. This example case uses both a primitive int (customerID) and serializable objects (Address, Name, CreditCard). In order to map the dependent objects to the database a mapping tool is needed. EJB attributes that are container-managed fields must have corresponding types, that is, corresponding columns in a database table to which the EJB attributes are mapped. The CustomerBean might, for example, map to a CUSTOMER table in the database that has the following definition:

```
CREATE TABLE CUSTOMER
{
    id              INTEGER PRIMARY KEY,
    last_name       CHAR(30),
    first_name      CHAR(20),
    middle_name     CHAR(20),
    street          CHAR(50),
    city            CHAR(20),
    state           CHAR(2),
```

-continued

```
    zip             CHAR(9),
    credit_number   CHAR(20),
    credit_date     DATE,
    credit_name     CHAR(20),
    credit_type     CHAR(10)
}
```

With container-managed persistence, the EJB container needs a mapping tool that can map the bean's container-managed fields or attributes to their corresponding columns in a specific table, CUSTOMER in this example. Once the EJB's attributes are mapped to the database, and the EJB is deployed, the container will manage creating records, updating records, and deleting records in the corresponding database table in response to methods invoked on the EJB. The following exemplary XML file is an example of a conventional for mapping of EJB attributes to database columns:

```
<?xml version="1.0" encoding="UTF-8"?>
    <map ejbattr=a1 ejb=b1 col=c1 table=t1 database=db1 schema=s1 />
    <map ejbattr=a2 ejb=b1 col=c1 table=t1 database=db1 schema=s1 />
    <map ejbattr=a1 ejb=b1 col=c2 table=t1 database=db3 schema=s2 />
    <map ejbattr=a1 ejb=b1 col=c3 table=t2 database=db3 schema=s2 />
    <map ejbattr=a2 ejb=b1 col=c3 table=t2 database=db3 schema=s2 />
```

This is a simple example of what is referred to in this specification as a 'flat mapping,' called a flat mapping because each mapping element contains references to all variable characteristics needed for mapping one EJB attribute to one database column. Readers of skill will recognize immediately that practical mappings are very voluminous, mapping many, many attributes to database columns. In addition, it is often necessary to install an EJB in more than one operating environment where more than one database schema is used for the same set of EJB attributes. That is, across multiple installations of the same EJB, the same EJB attributes are mapped to many variations of schema name, database name, table name, and column name. Modifying a mapping such as the example above requires searching through the mapping and changing each occurrence of a changed schema name, database name, table name, or column name, each of which occurs in each map entry of the structure—of which there will be many. This is a burdensome task, time consuming, and difficult to automate. For these reasons, there is a long-felt need for improved methods of mapping EJB attributes to database schema.

SUMMARY OF THE INVENTION

Method, systems, and products are disclosed for mapping Enterprise Java Bean ("EJB") attributes to database schema including providing a first metamap including one or more abstracted variable characteristics of a first database schema, and creating from the first metamap a second metamap for a second database schema including varying one or more of the abstracted variable characteristics to conform to the second database schema. Typical embodiments also include synchronizing, in response to methods invoked on the EJB and in dependence upon the second metamap, the state of the EJB with a persistent data store having the second database schema. In typical embodiments synchronizing the state of the EJB with a persistent data store having the second database schema also includes creating records, updating records, and deleting records in the persistent data store. In typical embodiments, creating a second metamap also includes editing by a user of the first metamap. In typical embodiments, editing the first metamap also includes prompting the user by a wizard for changes in the first metamap.

In typical embodiments providing a first metamap also include abstracting, from a mapping of EJB attributes to columns of the first database schema, one or more variable characteristics of the first database schema. In typical embodiments, variable characteristics of the first database schema include schema name, database name, table name, and column name. In typical embodiments, abstracting variable characteristics of the first database schema also include inserting in the first metamap an element representing each abstracted variable characteristic. In typical embodiments, abstracting variable characteristics of the first database schema also includes moving table and column descriptions from the mapping into a table file linked to the first metamap with a table identifier, including names of the abstracted variable characteristics; deleting from the table file the names of the abstracted variable characteristics; moving mapping descriptions from the mapping into a field mapping file linked to the first metamap with a mapping identifier, including names of the abstracted variable characteristics; and deleting from the field mapping file the names of the abstracted variable characteristics.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for mapping Enterprise Java Bean™ ("EJB") attributes to database schema. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Mapping Enterprise Java Bean Attributes to Database Schema

Figure 1:
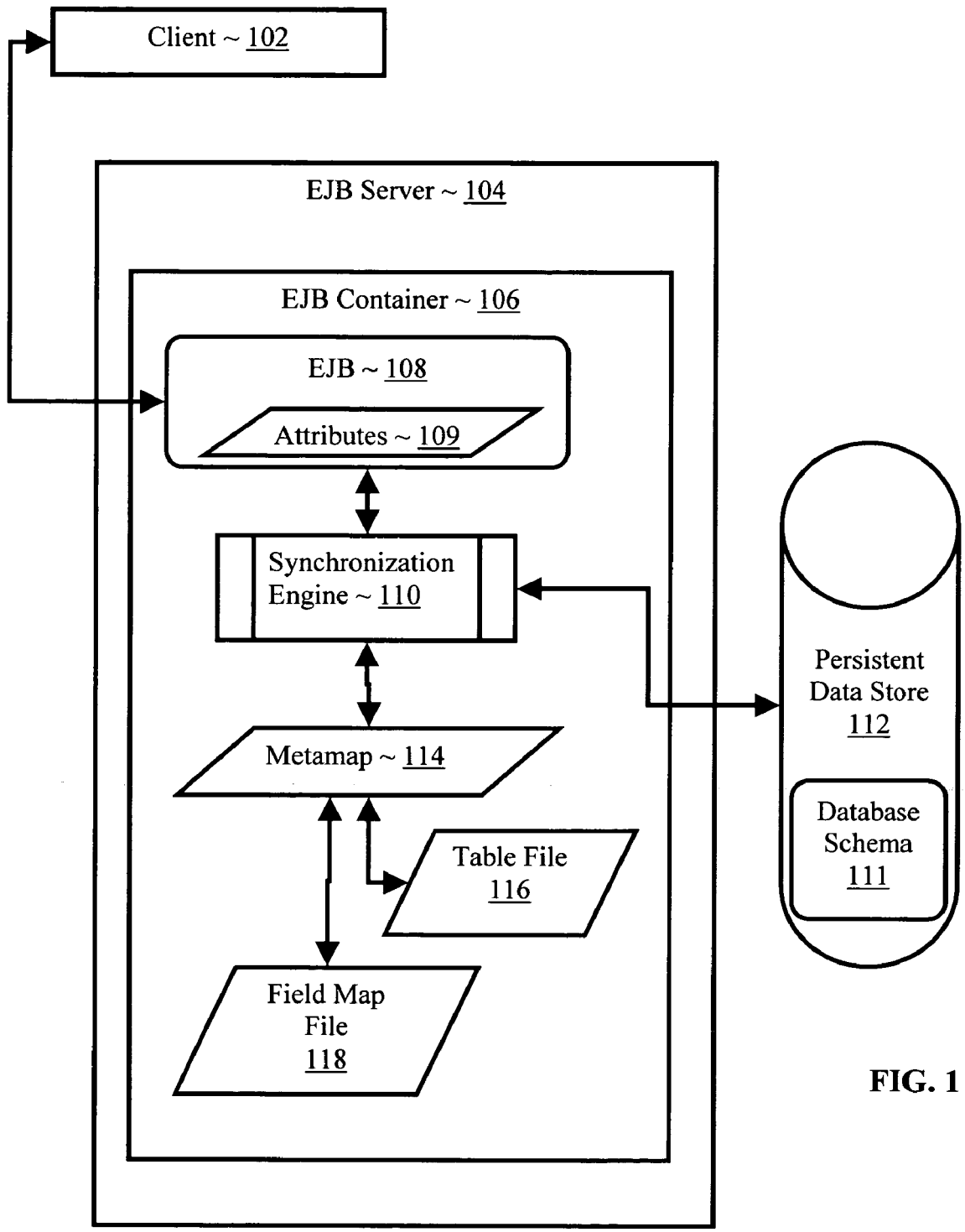
FIG. 1 sets forth a block diagram of an exemplary system for mapping EJB attributes to database schema.

Exemplary methods, systems, and computer program products for mapping EJB attributes to database schema are described with reference to the accompanying drawings, beginning with FIG. 1. FIG. 1 sets forth a block diagram of an exemplary system for mapping EJB attributes (109) to database schema (111) that includes an EJB (108) installed in an EJB container (106) on an EJB server (104). The EJB attributes (109) are the member data elements of the EJB (108) that are exposed for manipulation by client applications (102). The EJB attributes (109) are backed up for persistence with columns of data in tables in databases organized in schema in a persistent data store (112).

The system of FIG. 1 includes a synchronization engine that operates in response to the invocation of methods on the EJB (108) to synchronize the state of the EJB with a persistent data store (112) having the second database schema (204). The synchronization engine (110) uses the metamap (114) to map EJB attributes (109) to columns in persistent data store (112) for executing the business logic of EJB (108), creating, updating, and deleting records in the data store that correspond to and maintain persistence for the EJB's attributes (109).

Metamap (114) contains data elements representing abstracted variable characteristics of the persistent store. In this example, variable characteristics of the persistent core are abstracted from a flat mapping of prior art by moving table and column descriptions from the flat mapping into a table file linked to the metamap (114) with a table identifier (524) and moving mapping descriptions from the mapping into a field mapping file (118) linked to the metamap (114) with a mapping identifier. Such a procedure creates a metamap (114) in which the schema name and database name are abstracted into the metamap and excluded from the metamap's subsidiary structures, the table file and the field map file. In this way, rather than being named in each mapping element, the schema and the database are named only once each in the metamap. Therefore, creating a new metamap from metamap (114) is greatly simplified to the extent that the new metamap uses a different schema name or database name. Here is an XML example of a metamap an its subsidiary structures for abstracting variable characteristics of database schema:

```
METAMAP:
<?xml version="1.0" encoding="UTF-8"?>
<schema schema_id schema_name>
    <database database_id database_name>
        <table> table_id, reference to TABLE FILE
            <map> column_id, reference to FIELDMAP FILE </col>
            . . .
        </table>
        . . .
    </database>
    . . .
</schema>
. . .
. . .
</xml>
TABLE FILE:
<?xml version="1.0" encoding="UTF-8"?>
<table> // includes actual table description, including columns:
    <col> column_id, column name, actual column description </col>
    . . .
</table>
. . .
. . .
</xml>
FIELDMAP FILE:
<?xml version="1.0" encoding="UTF-8"?>
<fieldmap> column_id ejb_attribute </fieldmap>
. . .
. . .
</xml>
```

The data elements in this example that are characterized as identifiers or 'ids,' schema_id, database_id, column_id, table_id, and so on, are identifiers within the overall mapping exemplified by the combination of the metamap, the table file, and the fieldmap file. The data elements characterized as 'names,' schema_name, database_name, table_name, and so on, are names in a naming system external to the metamap, that is, names in a file systems, a JNDI system, URL-style names, and so on. Because the table and column descriptions are tied to the metamap with identifiers and the names of abstracted variable characteristics (in this example, schema name and database name) occur only in the metamap, all the abstracted variable characteristics can be changed throughout the entire mapping system merely by changing their names at one location each in the metamap.

Consider an example for further explanation: An EJB installed in a first operating environment having a first database schema is to be installed again in a second operating environment having a second database schema. The EJB is part of a database-oriented computer software application that has never been installed in the second environment. The second environment, however, uses exactly the same relational database management system ("RDBMS") as does the first environment. The computer software application in question, the one that includes the EJB, also includes a database made up of tables and columns of data. The database here can be installed directly into the RDBMS of the second environment merely by inserting its tables into the RDBMS. Moreover, a database also exists on the RDBMS into which the new tables can be inserted. There is only one installation issue and that is that the schema name used by the database administrator in the second environment is different from the schema name used in the first environment and the database name is also different. In this example, according to embodiments of the present invention, a new metamap and therefore an entire new mapping data structure for the second environment can be generated merely by changing the schema name and the database name in the metamap to the new schema name and the new database name respectively.

Figure 2:
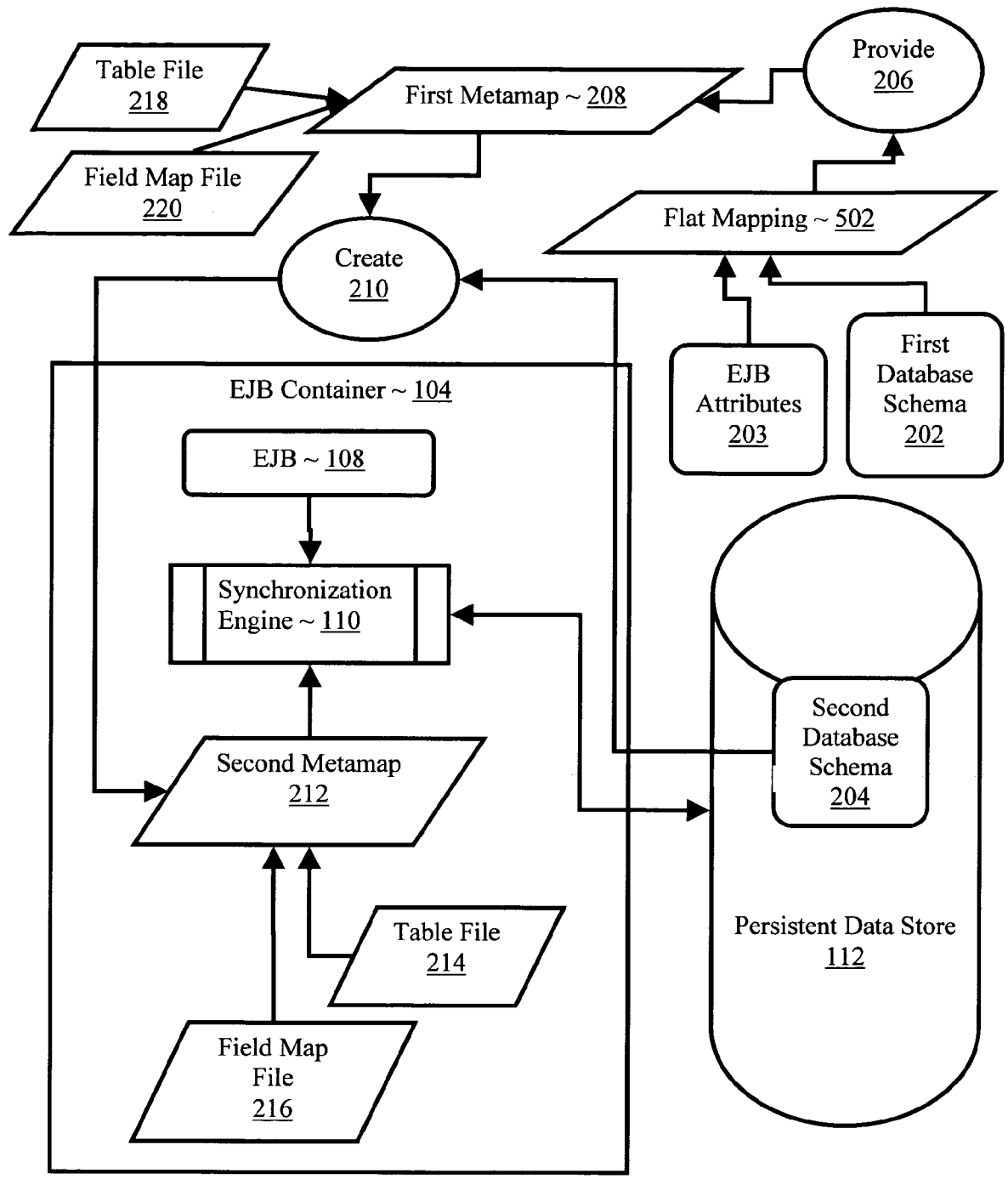
FIG. 2 sets forth a data flow diagram illustrating a method for mapping EJB attributes to database schema.

For further explanation, FIG. 2 sets forth a data flow diagram illustrating a method for mapping EJB attributes to database schema that includes providing (206) a first metamap (208). As described above, the first metamap is structured to include one or more abstracted variable characteristics of a first database schema (202). Variable characteristics of a database schema amenable to such abstraction include schema name, database name, table name, and column name. The method of FIG. 2 also includes creating (210) from the first metamap (208) a second metamap (212) for a second database schema (204). Creating (210) from the first metamap (208) a second metamap (212) for a second database schema (204) may be carried out by varying one or more of the abstracted variable characteristics from the first metamap to conform to the second database schema. For example, in a case where the schema name is abstracted into the first metamap and named 'schemaName1' and the schema name in the second database schema is 'someOtherSchemaName,' the schema name in the second metamap can be varied to 'someOtherSchemaName.'

Figure 3:
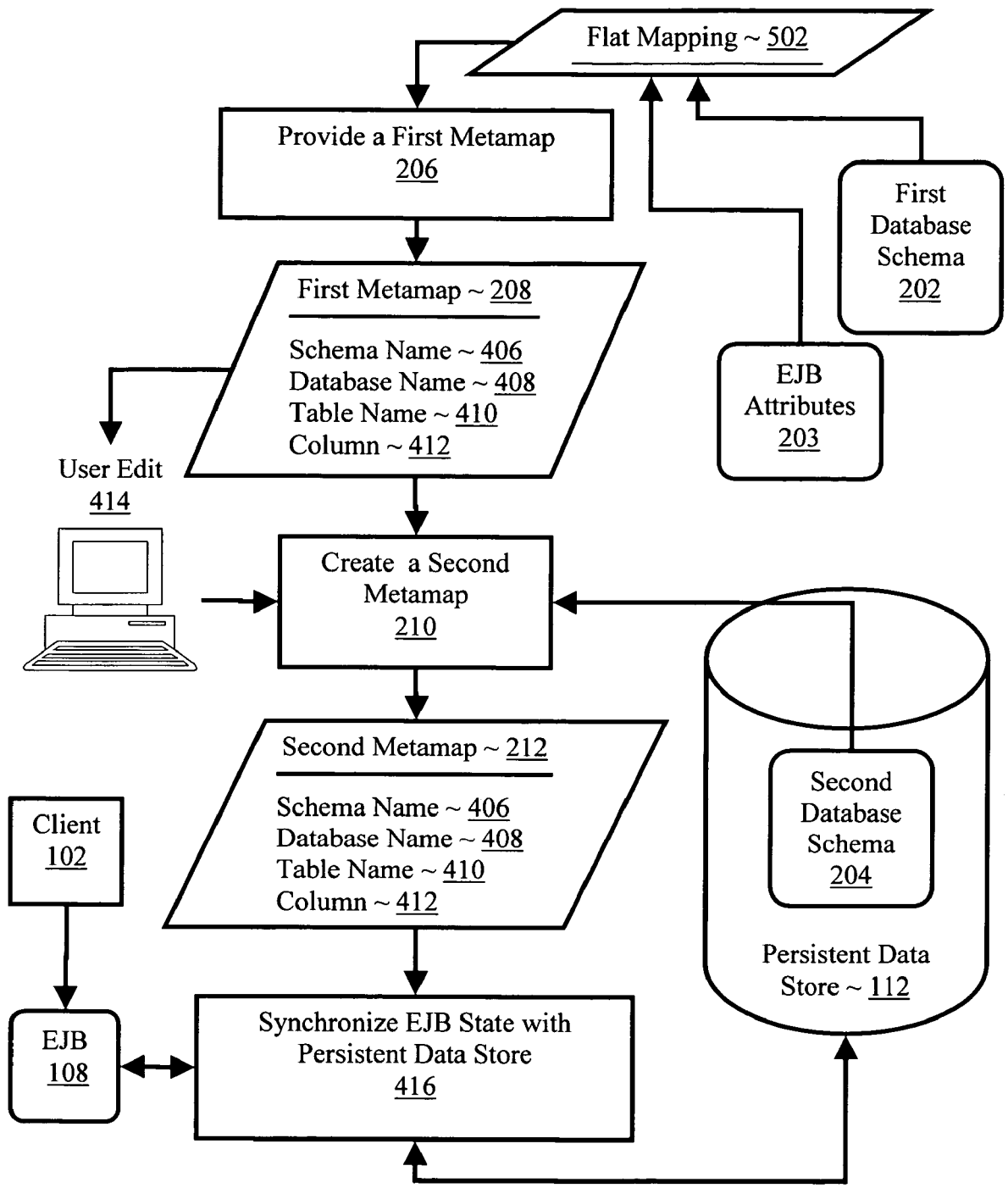
FIG. 3 sets forth a flow chart illustrating a further exemplary method for mapping EJB attributes to database schema.

For further explanation, FIG. 3 sets forth a flow chart illustrating a further exemplary method for mapping EJB attributes to database schema that includes providing (206) a first metamap (208), including one or more abstracted variable characteristics of a first database schema (202), and creating (210) from the first metamap (208) a second metamap (212) for a second database schema (204), including varying one or more of the abstracted variable characteristics to conform to the second database schema.

In the method of FIG. 3, creating (210) a second metamap may include editing (414) by a user of the first metamap (208). One way of editing (414) the first metamap (208) includes prompting the user by a wizard for changes in the first metamap. Such a wizard advantageously provides an efficient mechanism for prompting a user for changes to the first metamap, receiving from the user changes to the first metamap, and editing the first metamap according the changes to create the second metamap.

The method of FIG. 3 also includes synchronizing (416), in response to methods invoked on the EJB (108) and in dependence upon the second metamap (212), the state of the EJB with a persistent data store (112) having the second database schema (204). In the method of FIG. 3, synchronizing (416) the state of the EJB (108) with a persistent data store (112) having the second database schema (204) may include creating records, updating records, and deleting records in the persistent data store.

Figure 4:
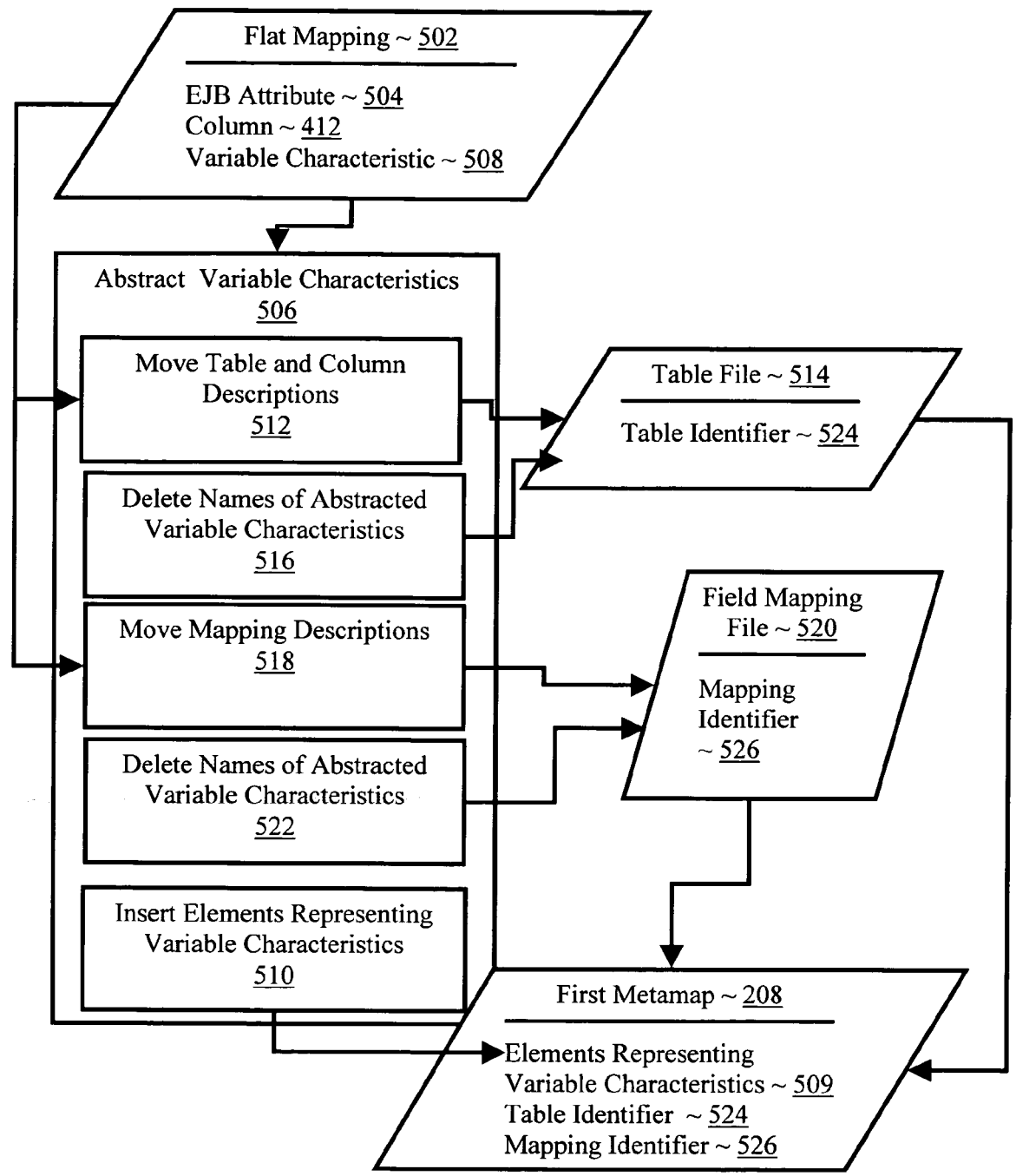
FIG. 4 sets forth a flow chart illustrating an exemplary method of providing a first metamap.

For further explanation, FIG. 4 sets forth a flow chart illustrating an exemplary method of providing a first metamap (208) that includes abstracting (506), from a mapping (502) of EJB attributes (504) to columns (412) of the first database schema, one or more variable characteristics (508) of the first database schema. In the method of FIG. 4, variable characteristics (508) of the first database schema may include schema name, database name, table name, and column name.

In the method of FIG. 4, abstracting (506) variable characteristics of the first database schema may include inserting (510) in the first metamap (208) an element (509) representing each abstracted variable characteristic. In the method of FIG. 4, abstracting (506) variable characteristics of the first database schema may also include moving (512) table and column descriptions from the mapping (502) into a table file (514) linked to the first metamap (208) with a table identifier (524), including names of the abstracted variable characteristics; deleting (516) from the table file (514) the names of the abstracted variable characteristics; moving (518) mapping descriptions from the mapping (512) into a field mapping file (520) linked to the first metamap (208) with a mapping identifier (526), including names of the abstracted variable characteristics; and deleting (522) from the field mapping file (520) the names of the abstracted variable characteristics.

Metamap:

```
<?xml version="1.0" encoding="UTF-8"?>
<schema id=SCHEMA1 name=MySCHEMA Description= . . . >
    <database id=db1 name=MyDB1 Description= . . . >
        <table id=schema1.db1.TABLE1 file=/temp/table.file>
            <fieldmap id=schema1.db1.table1.field1 /temp/
            fieldmap.xmi/>
            . . .
        </table>
        . . .
    </database>
    . . .
</schema>
. . .
<schema id=SCHEMA2 name=MySCHEMA2 Description= . . . >
    <database id=db1 name=MyDB1 Description= . . . >
        <table id=schema2.db1.TABLE1 file=/temp/table.file>
            <fieldmap id=schema1.db1.table1.field1 /temp/
            fieldmap.xmi/>
            . . .
        </table>
        <table id=TABLE2 file ==/temp/table2.file>
            <fieldmap id=schema1.db1.table2 /temp/fieldmap.xmi/>
            . . .
        </table>
    </database>
    . . .
</schema>
. . .
</xml>
// Table File (named 'table.file'):

<?xml version="1.0" encoding="UTF-8"?>
<table id=schema1.db1.TABLE1 name=MyTable1 {other
characteristics}/>
    <column xmi:type="RDBSchema:RDBColumn"
        xmi:id="schema1.db1.Table1.field1" name="myField"
        constraints="SQLConstraint_1081938656742
        SQLConstraint_1081938656743">
        <type xmi:type="RDBSchema:SQLDate"
            xmi:id="SQLDate_1081938656742">
            <originatingType xmi:type="RDBSchema:SQLDate"
            href=
            "DB2UDBOS390_V7_Primitives.xmi#SQLDate_1"/>
        </type>
    </column>
    . . .
</table>
. . .
<table id=schema1.db1.TABLE2 name=MyTable2 {other
characteristics}/>
    <column xmi:type="RDBSchema:RDBColumn"
        xmi:id="schema1.db1.Table2.field1" name="myField"
        constraints="SQLConstraint_1081938656742
        SQLConstraint_1081938656743">
        <type xmi:type="RDBSchema:SQLDate"
            xmi:id="SQLDate_1081938656742">
            <originatingType xmi:type="RDBSchema:SQLDate"
            href=
            "DB2UDBOS390_V7_Primitives.xmi#SQLDate_1"/>
        </type>
    </column>
    . . .
</table>
</xml>
```

-continued

```
// Fieldmap File (named 'fieldmap.xmi'):

<?xml version="1.0" encoding="UTF-8"?>
<fieldmap column_id=schema1.db1.table1.field1 file=/temp/table.file
    ejb_attribute_id=ejbattr1 file=/temp/META-INF/ejb-jar.xmi />
<fieldmap column_id=schema1.db1.table1.field2 file=/temp/table1.file
    ejb_attribute_id=ejbattr2 file=/temp/META-INF/ejb-jar.xmi />
. . .
</xml>
```

In this example, a single metamap file contains schemas with nested databases with nested tables with nested fields. One Table File contains the table and field or column descriptions. And one Fieldmap file contains all mappings for all fields between the table columns and the EJB attributes. An administrator may change the schema name, database name, table names or column names, and save these files with these changes to generate a new metamap for a new database schema in a new execution environment.

Each entry in the Fieldmap File represents a mapping of one EJB attribute to a database column, such as, for example:

```
<fieldmap column_id=schema1.db1.table1.field1 file=/temp/table.file
ejb_attribute_id=ejbattr1 file=/temp/META-INF/ejb-jar.xmi />,
``` in which an EJB attribute identified as 'ejbattr1' is mapped to a database column identified as 'schema1.db1.table1.field1.' The database column is further described in table.file, and the ejb-jar.xmi file is an extended deployment descriptor that describes JNDI bindings for the EJB attribute.

In this example, in the table file, the column definitions are typed according to:

```
<column xmi:type="RDBSchema:RDBColumn"
    xmi:id="schema1.db1.Table2.field1" name="myField"
    constraints="SQLConstraint_1081938656742
    SQLConstraint_1081938656743">
    <type xmi:type="RDBSchema:SQLDate"
        xmi:id="SQLDate_1081938656742">
        <originatingType xmi:type="RDBSchema:SQLDate"
        href="DB2UDBOS390_V7_Primitives.xmi#SQLDate_1"/>
    </type>
</column>,
``` for example, which includes a type for the column type called <originatingType>. This defines the column type by referencing a type instance in a document that identifies primitive types according to the Structured Query Language ("SQL"). The <originatingType> element is used to point to another XMI document which is specificic to the type and version of the database being used for EJB persistence, in this example, DB2UDBOS390_V7_Primitives.xmi. This is useful because of the differences in the way the datatypes are represented in the different versions of the persistence database. In this particular example, that is, DB2UDB on OS/390, ver. 7, is used. All its primitives are described in the DB2UDBOS390_V7_Primitives.xmi file. If Oracle V8.1 is used as the persistent database, then the href in this example could point to ORACLEV8i_Primitives.xmi, for example.

The above example is thus read as: a column named "myField" is of type SQLDate, with a constraint that points to another object. Constraints may be primary key, foreign key, and so on. How the data is physically represented on Db2 V7 on OS/390 can be determined from the DB2UDBOS390_V7_Primitives.xmi file, using SQL-Date_1 id.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for mapping Enterprise Java Bean ("EJB") attributes to database schema, the method comprising:

providing a first metamap including one or more abstracted variable characteristics of a first database schema, including abstracting, from a mapping of EJB attributes to columns of the first database schema, one or more variable characteristics of the first database schema, the abstracting further comprising moving table and column descriptions from the mapping into a table file linked to the first metamap with a table identifier, including names of the abstracted variable characteristics, deleting from the table file the names of the abstracted variable characteristics, moving mapping descriptions from the mapping into a field mapping file linked to the first metamap with a mapping identifier, including names of the abstracted variable characteristics, and deleting from the field mapping file the names of the abstracted variable characteristics; and creating from the first metamap a second metamap for a second database schema including varying one or more of the abstracted variable characteristics to conform to the second database schema.

2. The method of claim 1 further comprising synchronizing, in response to methods invoked on the EJB and in dependence upon the second metamap, the state of the EJB with a persistent data store having the second database schema.

3. The method of claim 2 wherein synchronizing the state of the EJB with a persistent data store having the second database schema further comprises creating records, updating records, and deleting records in the persistent data store.

4. The method of claim 1 wherein variable characteristics of the first database schema comprise schema name, database name, table name, and column name.

5. The method of claim 1 wherein abstracting variable characteristics of the first database schema further comprises inserting in the first metamap an element representing each abstracted variable characteristic.

6. A system for mapping Enterprise Java Bean ("EJB") attributes to database schema, the system comprising a computer processor and a computer memory operatively coupled to the computer processor, the computer memory having disposed within it computer program instructions, the system further comprising:

means for providing a first metamap including one or more abstracted variable characteristics of a first database schema, including means for abstracting, from a mapping of EJB attributes to columns of the first database schema, one or more variable characteristics of the first database schema, the means for abstracting further comprising means for moving table and column descriptions from the mapping into a table file linked to the first metamap with a table identifier, including names of the abstracted variable characteristics, means for deleting from the table file the names of the abstracted variable characteristics, means for moving mapping descriptions from the mapping into a field mapping file linked to the first metamap with a mapping identifier, including names of the abstracted variable characteristics, and means for deleting from the field mapping file the names of the abstracted variable characteristics; and means for creating from the first metamap a second metamap for a second database schema including means for varying one or more of the abstracted variable characteristics to conform to the second database schema.

7. The system of claim 6 further comprising means for synchronizing, in response to systems invoked on the EJB and in dependence upon the second metamap, the state of the EJB with a persistent data store having the second database schema.

8. The system of claim 7 wherein means for synchronizing the state of the EJB with a persistent data store having the second database schema further comprises means for creating records, means for updating records, and means for deleting records in the persistent data store.

9. The system of claim 6 wherein means for abstracting variable characteristics of the first database schema further comprises means for inserting in the first metamap an element representing each abstracted variable characteristic.

10. A computer program product for mapping Enterprise Java Bean ("EJB") attributes to database schema, the computer program product comprising:

means for providing a first metamap including one or more abstracted variable characteristics of a first database schema, including means for abstracting, from a mapping of EJB attributes to columns of the first database schema, one or more variable characteristics of the first database schema, the means for abstracting further comprising means for moving table and column descriptions from the mapping into a table file linked to the first metamap with a table identifier, including names of the abstracted variable characteristics, means for deleting from the table file the names of the abstracted variable characteristics, means for moving mapping descriptions from the mapping into a field mapping file linked to the first metamap with a mapping identifier, including names of the abstracted variable characteristics, and means for deleting from the field mapping file the names of the abstracted variable characteristics; and means for creating from the first metamap a second metamap for a second database schema including means for varying one or more of the abstracted variable characteristics to conform to the second database schema.

11. The computer program product of claim 10 further comprising means, recorded on the recording medium, for synchronizing, in response to computer program products invoked on the EJB and in dependence upon the second metamap, the state of the EJB with a persistent data store having the second database schema.

12. The computer program product of claim 11 wherein means, recorded on the recording medium, for synchronizing the state of the EJB with a persistent data store having the second database schema further comprises means, recorded on the recording medium, for creating records, means, recorded on the recording medium, for updating records, and means, recorded on the recording medium, for deleting records in the persistent data store.

13. The computer program product of claim 10 wherein variable characteristics of the first database schema comprise schema name, database name, table name, and column name.

14. The computer program product of claim 10 wherein means, recorded on the recording medium, for abstracting variable characteristics of the first database schema further comprises means, recorded on the recording medium, for inserting in the first metamap an element representing each abstracted variable characteristic.

* * * * *